Sept. 11, 1934.    M. H. BENEDEK    1,973,039
ELECTRICAL CONDENSER
Filed July 30, 1931
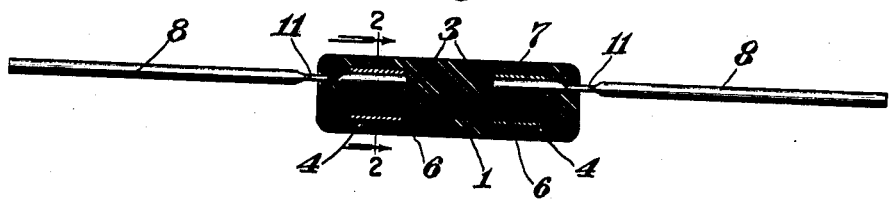
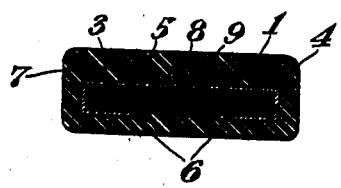
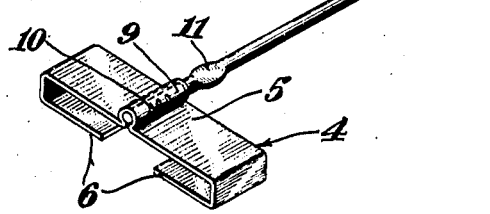
INVENTOR
Martin H. Benedek
BY
Ward Crosby & Neal
ATTORNEYS Patented Sept. 11, 1934

1,973,039

UNITED STATES PATENT OFFICE 1,973,039

ELECTRICAL CONDENSER

Martin H. Benedek, Brooklyn, N. Y., assignor to Micamold Radio Corporation, Brooklyn, N. Y., a corporation of New York Application July 30, 1931, Serial No. 553,993

5 Claims. (Cl. 175—41)

The invention relates to electrical condensers particularly of the types commonly used in radio receiving sets, which are of low capacity and frequently have to be kept within very narrow capacity limits.

The invention aims primarily to provide in connection with condensers of the above type a wire terminal construction which will afford less likelihood of change in capacity due to moisture seepage into the interior of the condenser during use, shifting of the internal parts of the condenser because of excessive heat during soldering operations, or other causes. It will also be understood that the wire lead affords certain other advantages such as ease of cutting it to any length or bending it to any shape as may be desired under varying conditions of installation.

Further objects and advantages of the invention will be in part obvious and in part specifically pointed out in the description hereinafter contained which, taken in conjunction with the accompanying drawing, discloses a preferred embodiment thereof; such embodiment, however, is to be considered as merely illustrative of its principles.

In the drawing—

Fig. 1 is a longitudinal section through a condenser constructed in accordance with the invention.

Fig. 2 is a transverse section thereof taken on line 2—2 of Fig. 1.

Fig. 3 is a perspective view showing separately the wire terminal and the clip to which it is attached.

It is frequently very important for use in radio receiving circuits, that the condensers be kept within very narrow capacity limits, and it has been found that the molded condensers in common use for such purposes frequently shift unduly in capacity during use. This may happen for a variety of causes; for example, during soldering operations a sufficient amount of heat may be conducted into the interior of the condenser through the terminals to expand and loosen up the active surfaces, or the soldering heat may be sufficient to loosen up the joint between the molded insulation and the terminals of the types commonly employed, thereby permitting moisture to seep into the interior of the condenser along the terminals.

I have found that by the use of wire terminals in the manner hereinafter described, the above objections may be largely overcome. The invention is disclosed as applied to a condenser having a stack 1, made up of interleaved sheets of conducting and dielectric material, such as tinfoil and mica, in the usual manner, the particular form of condenser which is illustrated having conducting sheets of opposite polarity with their ends 3 folded over on to a face of the stack, and the stack being clamped by clips 4 of stiff but bendable metal, which have their intermediate portions 5 engaging one face of the stack, and their end portions 6 bent around to engage the opposite face of the stack.

The condenser stack is embedded within a mass 7 of molded insulation, such as bakelite, which may be applied in manner well known in the art.

I provide the condenser with wire terminals 8 which are secured respectively to the clips 4, with the joints between the terminals and clips embedded in the molded insulation 7 and the terminals 8 projecting outwardly through the insulation in such manner that the latter forms a seal against the seepage of moisture into the interior of the condenser.

In the illustrated form of the invention the intermediate portion 5 of each clip 4 is shaped to provide a socket 9 into which the end of the corresponding wire terminal 8 is received, and if desired the socket 9 may be crimped or deformed as indicated at 10 (Fig. 3) after the terminal has been inserted therein, to insure good contact between the two conducting members.

The wire terminals 8 can readily be made of much smaller cross section and bulk than has been the case with the sheet metal terminals heretofore employed as terminals for condensers of the above type, with the result that when soldering heat is applied to the terminals, a much smaller amount of heat is conducted into the interior of the condenser, and furthermore the joint between the terminals 8 and the molded insulation 7 becomes substantially smaller and less likely to break loose or permit moisture to seep into the interior of the condenser.

The wire terminals will be stiff enough to support the condenser when so desired, but may nevertheless be readily bendable to permit them to be bent to various shapes or directions, as may be desired under varying conditions of use. Without unduly adding to the cost it also becomes feasible to supply the terminals in much longer lengths, the excess being readily cut off for conditions of use where only short terminals are required.

Where round wire is employed, the portion 11 of each terminal around which the insulation 7 is sealed, may be flattened out if desired, as shown in Fig. 3, to oppose any tendency of the wire to twist in the sockets 9 or the insulating material which encloses the terminal.

While a specific embodiment of the invention has been disclosed it will be understood that changes may be made therein without departing from the main features of the invention as set forth in the appended claims.

I claim:

1. An electrical condenser comprising a stack of dielectric and conducting sheets, a metal clip for clamping the stack, and a wire terminal in electrical connection with certain of said conducting sheets and secured to said clip, insulating material molded around said stack and clip, said wire terminal extending outwardly through said insulating material and being bendable in all directions but stiff enough to support the condenser in different positions, and the joint between the said terminal and clip being embedded within said insulating material.

2. An electrical condenser having a stack of dielectric and conducting sheets, a flexible metal clip clamping said stack, said clip having a portion shaped to provide a socket, a wire terminal in electrical connection with certain of said conducting sheets and received within said socket, and insulating material molded around said stack, clip and socket, said terminal projecting outwardly through said insulating material and being bendable in all directions but stiff enough to hold the condenser in different positions.

3. An electrical condenser having a stack of dielectric and conducting sheets, a flexible metal clip having its intermediate portion engaging one face of the stack and its end portions extending around to the opposite face of the stack to clamp the latter, the intermediate portion of such clip being shaped to provide a socket raised above its outer surface, a wire terminal in electrical connection with certain of said conducting sheets and seated in said socket, and insulating material molded around the stack, clip and socket, the said terminal projecting outwardly through said insulating material and being bendable in all directions but stiff enough to hold the condenser in different positions.

4. An electrical condenser comprising a stack of dielectric and conducting sheets, a wire terminal and means for rendering said wire terminal electrically connected to certain of said conducting sheets, insulating material molded around said stack, said condenser including a metal clip engaging opposite faces of said stack and in electrically conductive relation to said terminal and clip and the inner portion of said wire terminal, said wire terminal extending outwardly through said insulating material and being bendable in all directions but stiff enough to support the condenser in different positions.

5. An electrical condenser having a stack of dielectric and conducting sheets, metal clips each engaging opposite faces of said stack for clamping the same, and wire terminals each respectively electrically connected to certain of said conducting sheets and to one of said clips, said wire terminals being respectively held in position by said clips, insulating material molded around said stack and clips, said wire terminals extending outwardly through said insulating material and being bendable but stiff enough to support the condenser in different positions, the inner portions of said wire terminals being embedded within said insulating material.

MARTIN H. BENEDEK.

CERTIFICATE OF CORRECTION.

Patent No. 1,973,039.  September 11, 1934.

MARTIN H. BENEDEK.

It is hereby certified that error appears in the printed specification of the above numbered patent requiring correction as follows: Page 2, lines 90 to 93, claim 4, strike out the words "said condenser including a metal clip engaging opposite faces of said stack and in electrically conductive relation to said terminal" and insert the same after "sheets," in line 89, of said claim; and that the said Letters Patent should be read with this correction therein that the same may conform to the record of the case in the Patent Office.

Signed and sealed this 16th day of October, A. D. 1934.

(Seal)

Leslie Frazer
Acting Commissioner of Patents.